(12) United States Patent
Khor et al.

(10) Patent No.: US 9,325,445 B2
(45) Date of Patent: Apr. 26, 2016

(54) DEMULTIPLEXING DEVICE FOR OPTO-ELECTRONIC TRANSCEIVER

(71) Applicant: Avago Technologies General IP (Singapore) Pte. Ltd., Singapore (SG)

(72) Inventors: Albert Wooi-Quan Khor, Singapore (SG); Tak-Kui Wang, Cupertino, CA (US); Li Ding, Pleasanton, CA (US); Ye Chen, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/057,575

(22) Filed: Oct. 18, 2013

(65) Prior Publication Data

US 2015/0110493 A1    Apr. 23, 2015

(51) Int. Cl.
| G02B 6/28 | (2006.01) |
| H04J 14/02 | (2006.01) |
| G02B 6/293 | (2006.01) |
| H04Q 11/00 | (2006.01) |
| G02B 6/42 | (2006.01) |

(52) U.S. Cl.
CPC ............. *H04J 14/02* (2013.01); *G02B 6/29365* (2013.01); *G02B 6/4215* (2013.01); *G02B 6/4214* (2013.01); *G02B 6/4255* (2013.01); *H04Q 2011/0009* (2013.01); *H04Q 2011/0016* (2013.01)

(58) Field of Classification Search
CPC .................................. G02B 6/28; G02B 6/32
USPC .......................................................... 385/47
See application file for complete search history.

(56) References Cited

U.S. PATENT DOCUMENTS

| 5,259,054 | A | 11/1993 | Benzoni et al. | |
| 6,201,908 | B1* | 3/2001 | Grann | G02B 6/29358 385/24 |
| 6,249,627 | B1 | 6/2001 | Bond et al. | |
| 7,130,320 | B2* | 10/2006 | Tobiason | H01S 3/1062 372/100 |
| 2003/0020913 | A1* | 1/2003 | Richard | G01B 11/27 356/399 |
| 2004/0067014 | A1* | 4/2004 | Hollars | G02B 6/29365 385/33 |
| 2004/0101247 | A1* | 5/2004 | Chen | G02B 6/29367 385/47 |
| 2004/0136074 | A1* | 7/2004 | Ford | G02B 6/2931 359/572 |
| 2005/0031256 | A1* | 2/2005 | Paatzsch | G02B 6/29365 385/24 |
| 2006/0154529 | A1* | 7/2006 | Erdman | G02B 6/3825 439/654 |
| 2007/0230868 | A1* | 10/2007 | Miyadera | G02B 6/2813 385/24 |
| 2011/0206328 | A1* | 8/2011 | Wang | G02B 6/4292 385/94 |
| 2012/0033979 | A1* | 2/2012 | Priyadarshi | G02B 6/4246 398/141 |
| 2015/0110493 | A1* | 4/2015 | Khor | H04J 14/02 398/88 |

OTHER PUBLICATIONS

Lee, S.H., et al., "Design and Fabrication of Silicon Optical Bench for Passive-Aligned Optical Packaging," Journal of the Korean Physical Society, vol. 33, Nov. 1998, pp. S444-S449.

(Continued)

*Primary Examiner* — Kaveh C Kianni (57) ABSTRACT

An optical demultiplexing device includes an optics body, a mirror, optical filters, and opto-electronic detectors. The optics body has a fiber port configured to receive an end of an optical fiber, a reflective surface aligned with the fiber port, a substantially planar filter mounting surface, and a substantially planar mirror mounting surface. The filter mounting surface and the mirror mounting surface are parallel to one another and formed on the same side of the optics body as each other. The mirror is mounted on the mirror mounting surface, and the filters are mounted on the filter mounting surface. Each filter is transparent to a different wavelength and is interposed in an optical path between one of the opto-electronic detectors and the reflector.

19 Claims, 11 Drawing Sheets

(56) References Cited

OTHER PUBLICATIONS

Yoshimura, T., "Self-Organized Three-Dimensional Optical Circuits and Molecular Layer Deposition for Optical Interconnects, Solar Cells, and Cancer Therapy." in Xi, P., "Optical Devices in Communication and Computation," Chapter 5, (published on-line, InTech, Sep. 19, 2012), pp. 81-106. Retrieved from the Internet: <URL: http://dx.doi.org/10.5772/48221>.

* cited by examiner

DEMULTIPLEXING DEVICE FOR OPTO-ELECTRONIC TRANSCEIVER

BACKGROUND

Optical data transceiver modules convert optical signals received via an optical fiber into electrical signals and convert electrical signals into optical signals for transmission via an optical fiber. In the transmitter portion of a transceiver module, a light source such as a laser performs the electrical-to-optical signal conversion. In the receiver portion of the transceiver module, a light receiver such as a photodiode performs the optical-to-electrical signal conversion. A transceiver module commonly also includes optical elements, such as lenses, as well as electrical circuitry such as drivers and receivers. A transceiver module also includes one or more fiber ports to which an optical fiber cable is connected. The light source, light receiver, optical elements and electrical circuitry are mounted within a module housing. The one or more fiber ports are located on the module housing.

Figure 1:
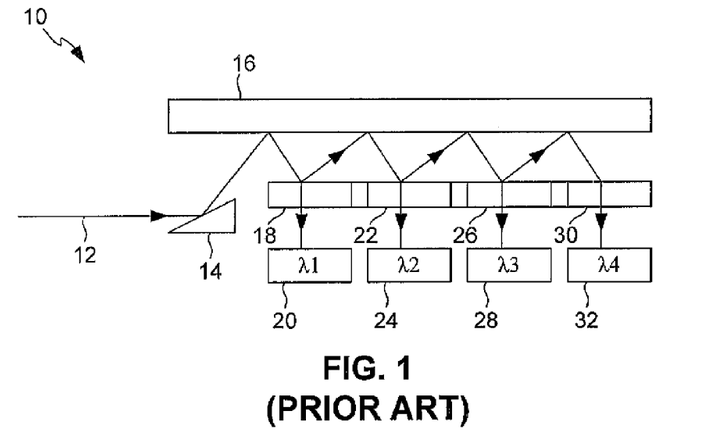
FIG. 1 is diagrammatic illustration of a demultiplexing device in accordance with the prior art.

As illustrated in FIG. 1, transceiver modules are known in which the receiver 10 performs a demultiplexing function. Optical signals 12 comprising four different modulated wavelengths $\lambda 1$, $\lambda 2$, $\lambda 3$ and $\lambda 4$ are received and reflected by a reflective surface 14 onto a reflector or mirror 16. (The terms "reflective surface," "reflector" and "mirror" are used synonymously herein, as any of these elements can comprise any of various types of structures that reflect optical signals 12.) Mirror 16 first reflects optical signals 12 onto a first filter 18, which is transparent to the single wavelength $\lambda 1$ and reflective to the other wavelengths $\lambda 2$, $\lambda 3$ and $\lambda 4$. Thus, the portion of optical signals 12 that impinge on first filter 18 and consist of wavelength $\lambda 1$ pass through first filter 18 and impinge on a first light receiver or opto-electronic detector 20. The remaining portion of optical signals 12 that impinge on first filter 18 and consist of wavelengths other than $\lambda 1$ are reflected by first filter 18 and impinge on mirror 16. Mirror 16 reflects that remaining portion of optical signals 12 onto a second filter 22, which is transparent to the single wavelength $\lambda 2$ and reflective to at least $\lambda 3$ and $\lambda 4$. Thus, the portion of optical signals 12 that impinge on second filter 22 and consist of wavelength $\lambda 2$ pass through second filter 22 and impinge on a second light receiver or opto-electronic detector 24. The remaining portion of optical signals 12 that impinge on second filter 22 and consist of wavelengths other than $\lambda 2$ are reflected by second filter 22 and impinge on mirror 16. Mirror 16 reflects that remaining portion of optical signals 12 onto a third filter 26, which is transparent to the single wavelength $\lambda 3$ and reflective to at least $\lambda 4$. Thus, the portion of optical signals 12 that impinge on third filter 26 and consist of wavelength $\lambda 3$ pass through third filter 26 and impinge on a third light receiver or opto-electronic detector 28. The remaining portion of optical signals 12 that impinge on third filter 26 and consist of wavelengths other than $\lambda 3$ are reflected by third filter 26 and impinge on mirror 16. Mirror 16 reflects that remaining portion of optical signals 12 onto a fourth filter 30, which is transparent to the single wavelength $\lambda 4$. Thus, the portion of optical signals 12 that impinge on fourth filter 30 and consist of wavelength $\lambda 4$ pass through fourth filter 30 and impinge on a fourth light receiver or opto-electronic detector 32. Although in receiver 10 shown in FIG. 1 four wavelengths are demultiplexed, other receivers are known in which a number of wavelengths other than four are demultiplexed in a similar manner.

To achieve proper operation, it is important that the surfaces of filters 18, 22, 26 and 30 be very precisely parallel to the surface of mirror 16. Achieving a precisely parallel orientation can present manufacturing challenges. It would be desirable to provide an optical demultiplexing device that promotes achieving such an orientation consistently and quickly in manufacturing.

SUMMARY

Embodiments of the present invention relate to an optical demultiplexing device that comprises an optics body, a mirror, a plurality of optical filters, and a plurality of opto-electronic detectors. In an exemplary embodiment, the optics body has a fiber port configured to receive an end of an optical fiber, a reflective surface aligned with the fiber port, a substantially planar filter mounting surface, and a substantially planar mirror mounting surface. The filter mounting surface and the mirror mounting surface are parallel to one another and parallel to a reference plane. The mirror has a planar shape and is mounted on the mirror mounting surface. The plurality of filters are mounted on the filter mounting surface. Each filter is partially reflective and partially transparent. Each filter is transparent to a different wavelength than the others. Each of the plurality of filters is interposed in one of a corresponding plurality of optical paths between one of the plurality of opto-electronic detectors and the mirror. A parallel orientation between the filters and the mirror can be achieved with precision because no portion of the optics body intervenes between the filter mounting surface and the reference plane, and no portion of the optics body intervenes between the mirror mounting surface and the reference plane.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 2:
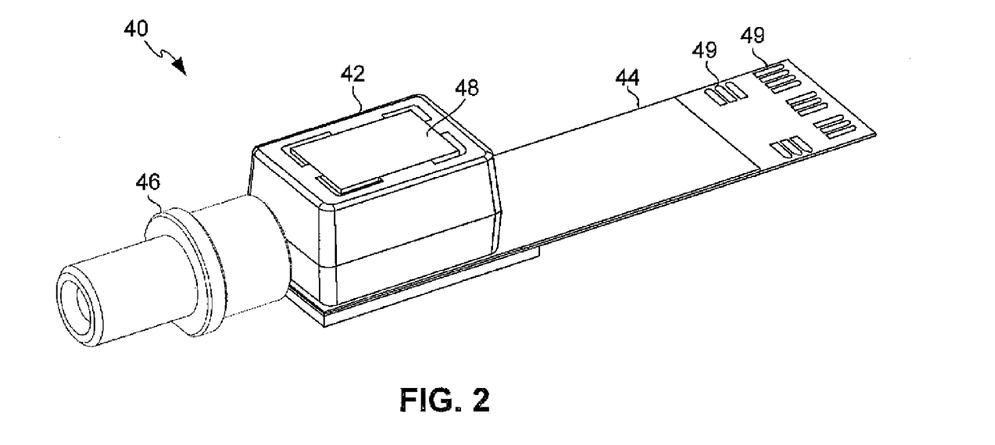
FIG. 2 is a perspective view of a demultiplexing device in accordance with an exemplary embodiment of the invention.
Figure 3:
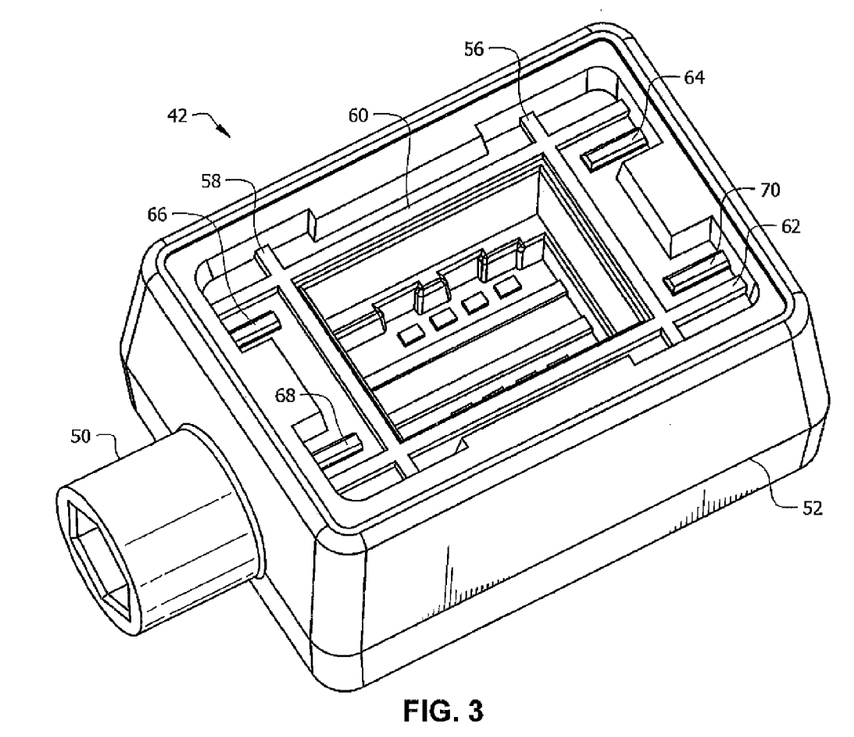
FIG. 3 is a perspective view of the optics body of the demultiplexing device of FIG. 2.
Figure 4:
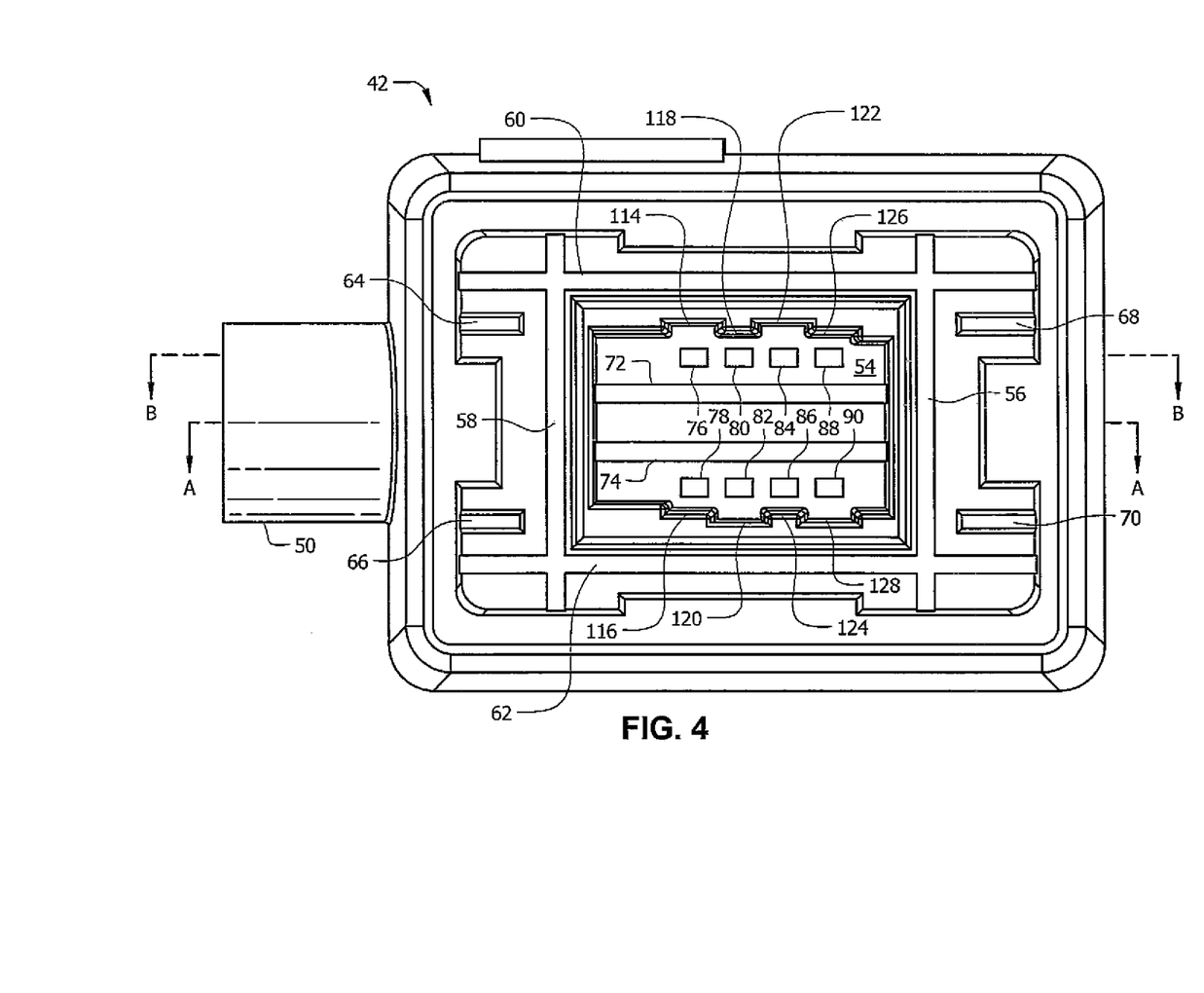
FIG. 4 is top plan view of the optics body of the demultiplexing device of FIG. 2.
Figure 5:
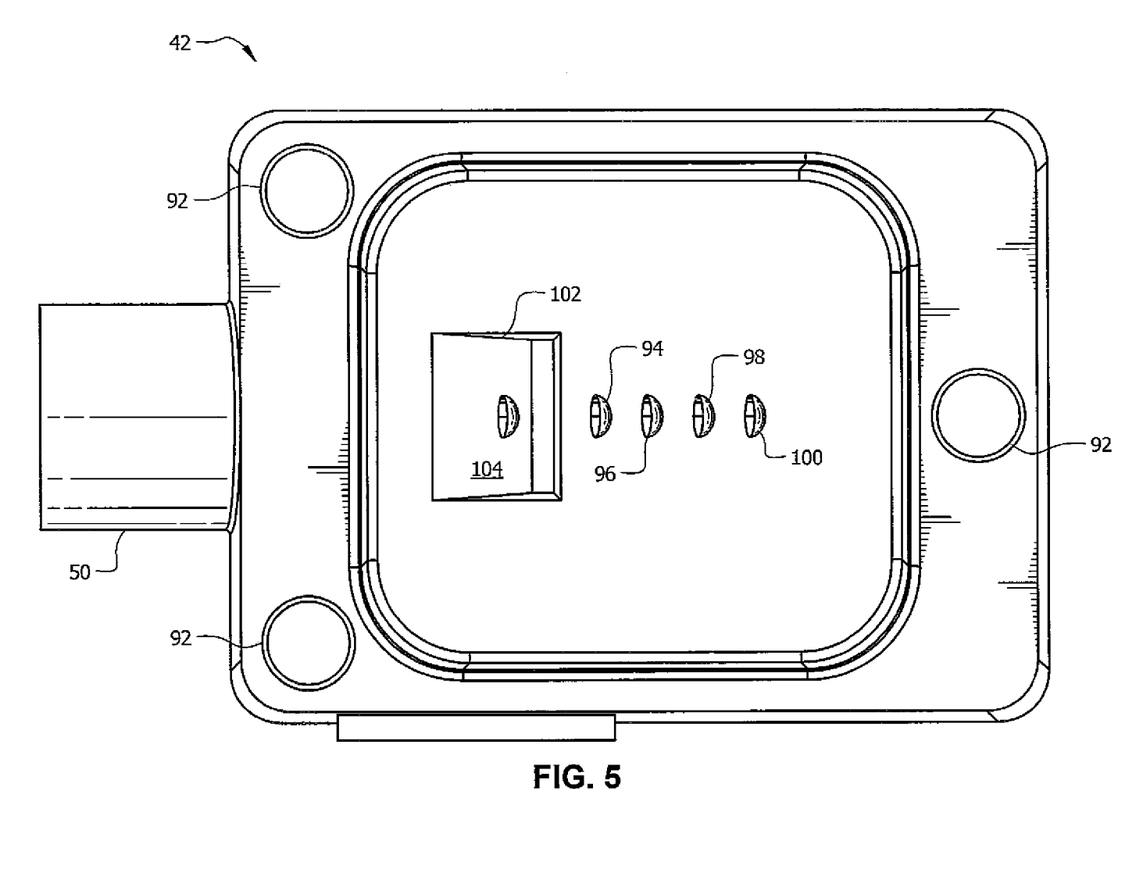
FIG. 5 is a bottom plan view of the optics body of the demultiplexing device of FIG. 2.
Figure 6:
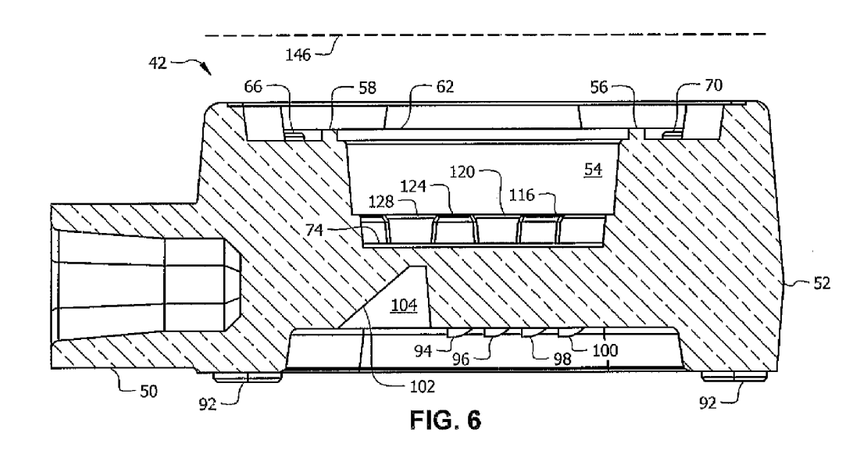
FIG. 6 is a sectional view of the optics body, taken on line A-A of FIG. 4.

As illustrated in FIG. 2, in an illustrative or exemplary embodiment of the invention, an optical demultiplexing device 40 includes an optics body 42 mounted on a printed circuit board assembly 44. Optical demultiplexing device 40 further includes an LC connector assembly 46 attached to a forward end of optics body 42. Printed circuit board assembly 44 has an elongated rectangular shape and approximately the same width as optics body 42 and extends rearward of optics body 42. A planar mirror 48, which can comprise, for example, a metalized layer on a glass substrate, is mounted on the upper side of optics body 42. The lower side of optics body 42 is attached to the surface of printed circuit board assembly 44 at a forward end of printed circuit board assembly 44 as described below. The rear of printed circuit board assembly 44 includes electrical contact fingers 49.

As illustrated in FIGS. 3-11, optics body 42 has a generally rectangular, boxy shape, with a fiber port 50 at its forward end. Optics body 42 is unitarily formed as a solid or continuous block of optically transparent plastic material. An example of a suitable material is amorphous thermoplastic polyetherimide, such as the ULTEM® family of plastics available from SABIC Innovative Plastics of Saudi Arabia (formerly General Electric Plastics Division). The block of material defining optics body 42 can be formed by, for example, injection molding, as evidenced by the parting line 52 shown in FIGS. 3, 6-8, 10 and 11.

The top or upper side of optics body 42 has a cavity or recessed region 54 (see FIGS. 4 and 6-11). For reasons discussed below, it is significant that all of the elements of optics body 42 discussed below with regard to achieving precise optical alignment are present on the same (upper) side of optics body 42 as each other. This arrangement can be achieved by injection molding optics body 42 using a two-cavity mold (not shown) in which corresponding elements are present on the same face of a mold cavity as each other. Parting line 52 evidences the boundary where the two mold halves or cavities adjoined during such a molding process.

As illustrated in FIGS. 4 and 6-11, within recessed region 54 is a mirror mounting surface defined by four flat ridges 56, 58, 60 and 62. Ridges 56 and 58 are parallel to each other and perpendicular to ridges 60 and 62, which are parallel to each other. Each of ridges 56 and 58 intersects both of ridges 60 and 62, and each of ridges 60 and 62 intersects both of ridges 56 and 58. The mirror mounting surface can be referred to as "substantially" planar because together the flat surfaces or tops of ridges 56-62 define a plane. As described below, planar mirror 48 is mounted on the mirror mounting surface.

Also within recessed region 54 is a mirror attachment surface defined by four flat ridges 64, 66, 68 and 70. Ridges 64-70 are recessed below ridges 56-62. Thus, the mirror attachment surface is recessed below the mirror mounting surface. The term "below" as used herein refers to a "depth" direction from the upper side of optics body 42 toward a lower side of optics body 42.

Also within recessed region 54 is a filter mounting surface defined by two flat ridges 72 and 74 that are oriented parallel to each other in a longitudinal (i.e., forward-rearward) direction of optics body 42. The filter mounting surface can be referred to as "substantially" planar because together the flat surfaces or tops of ridges 72 and 74 define a plane.

Also within recessed region 54 is a filter attachment surface defined by four pairs of flat platforms 76 and 78, 80 and 82, 84 and 86, and 88 and 90, respectively. Platforms 76-90 are recessed below ridges 72 and 74. Thus, the filter attachment surface is recessed below the filter mounting surface.

As illustrated in FIGS. 5-8, 10 and 11, the bottom or lower side of optics body 42 has three feet 92 to aid mounting on printed circuit board assembly 44. Also on the lower side of optics body 42 are four lenses 94, 96, 98 and 100. In addition, a reflective surface 102 is formed in a cavity 104 in the lower side of optics body 42. Reflective surface 102 is oriented at an oblique angle to the above-referenced longitudinal direction.

Figure 7:
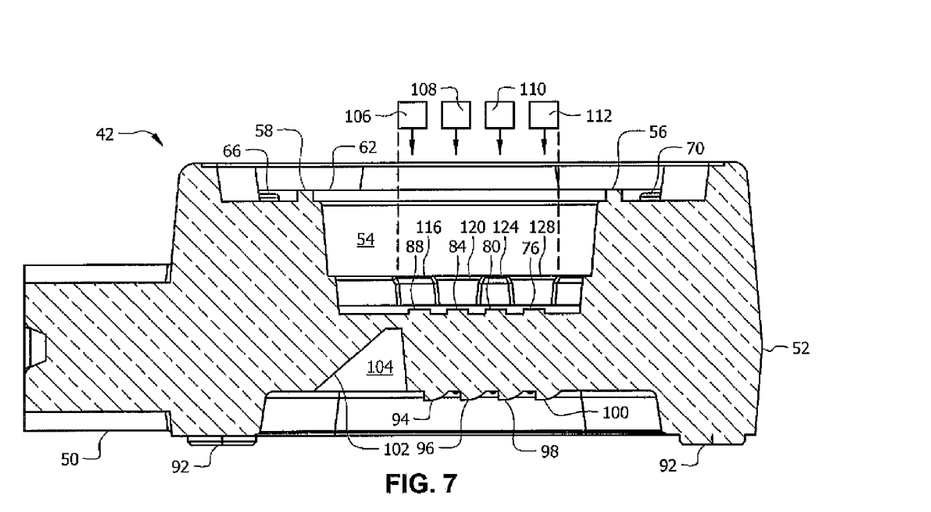
FIG. 7 is a sectional view of the optics body, taken on line A-A of FIG. 4, showing mounting of the filters.
Figure 8:
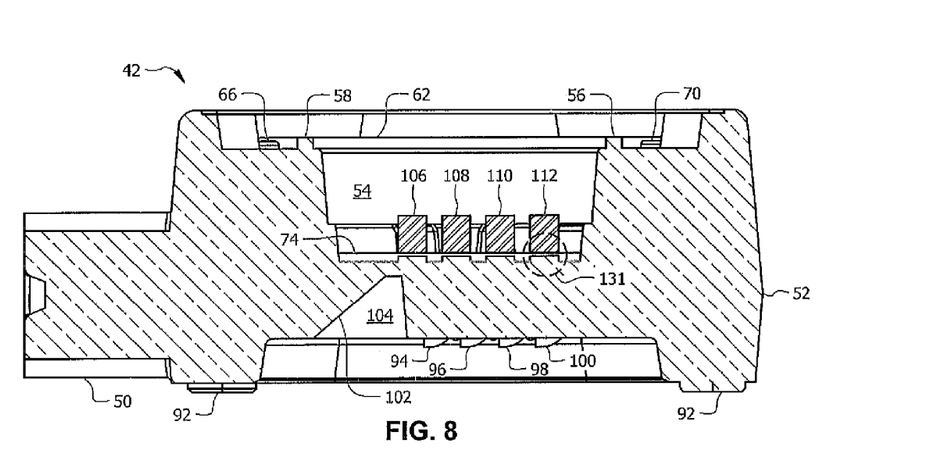
FIG. 8 is similar to FIG. 7, showing the filters mounted in the optics body.
Figure 9:
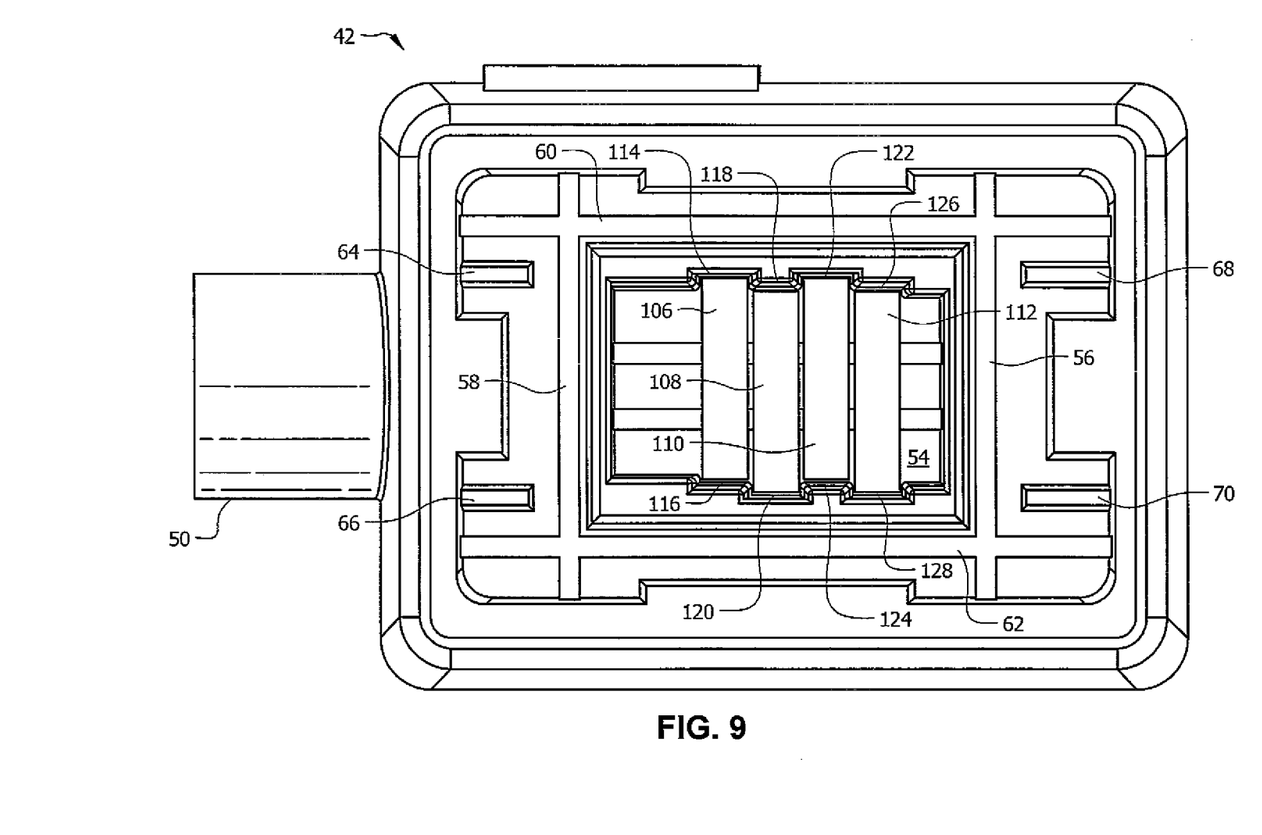
FIG. 9 is a top plan view showing the filters mounted in the optics body.

As illustrated in FIGS. 7-9, four filters 106, 108, 110 and 112 can be placed in four corresponding mounts within recessed region 54, which can be referred to for convenience as "first" through "fourth" mounts. Each of filters 106-112 can comprise, for example, a thin-film coating on a brick-shaped glass substrate. With further reference again to FIG. 4, the first mount is defined by a region extending between opposing walls 114 and 116 of recessed region 54; the second mount is defined by a region extending between opposing walls 118 and 120 of recessed region 54; the third mount is defined by a region extending between opposing walls 122 and 124 of recessed region 54; and the fourth mount is defined by a region extending between opposing walls 126 and 128 of recessed region 54. Note that walls 114, 118, 122 and 126 are staggered, and opposing walls 116, 120, 124 and 128 are also staggered. This staggered-wall arrangement retains the ends of filters 106-112 against movement in two directions without any additional elements occupying space between adjacent ones of filters 106-112. Also note that when filters 106-112 are mounted in this manner, they rest upon or are in contact with the above-described substantially planar filter mounting surface defined by ridges 72 and 74. However, also note that when filters 106-112 are mounted in this manner, there is a gap between the bottoms of filters 106-112 and the surfaces of platforms 76-90. The purpose of this gap is described below.

Figure 10:
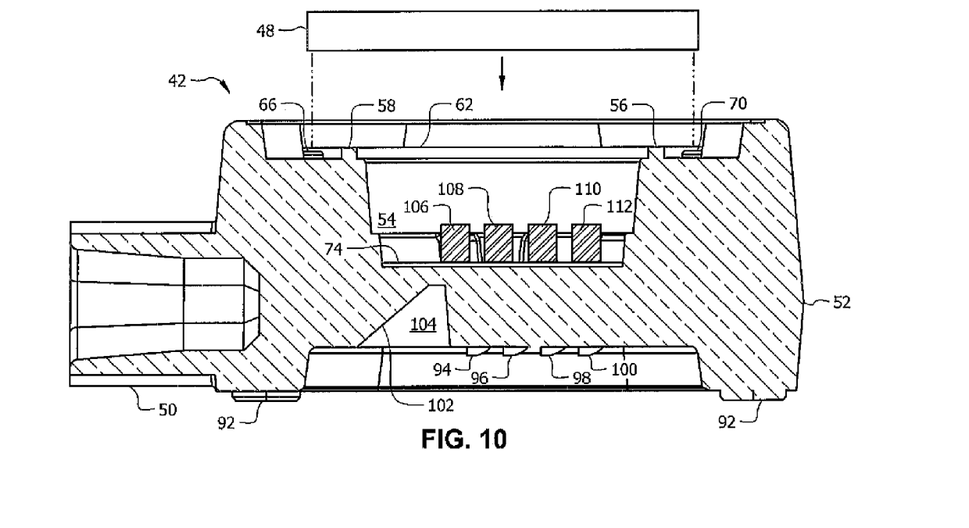
FIG. 10 is a sectional view of the optics body, taken on line B-B of FIG. 4 showing mounting of the planar mirror into the optics body.
Figure 11:
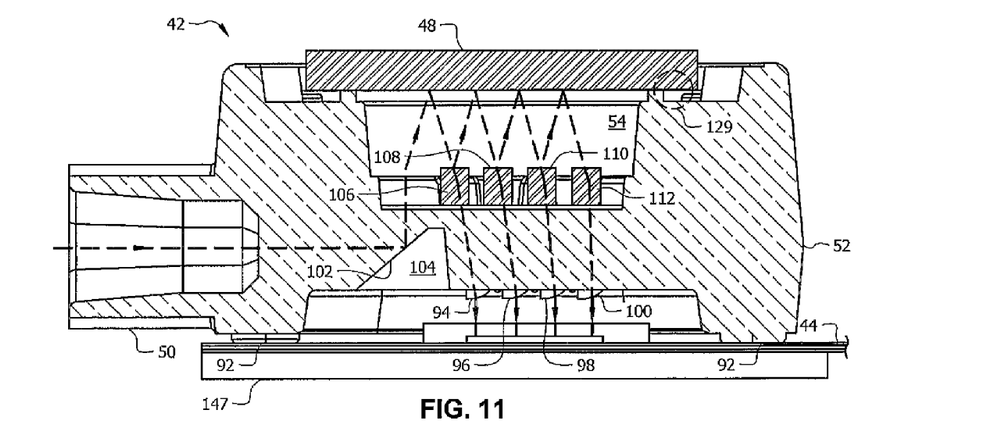
FIG. 11 is similar to FIG. 10, showing the filters and planar mirror mounted in the optics body.

As illustrated in FIGS. 10-11, mirror 48 can be placed on the above-described mirror mounting surface defined by ridges 56-62. That is, when mirror 48 is mounted in this manner, it rests upon or is in contact with ridges 56-62. However, when mirror 48 is mounted in this manner, there is a gap between the bottom of mirror 48 and the surfaces of ridges 64-70. The purpose of this gap is described below.

Figure 12:
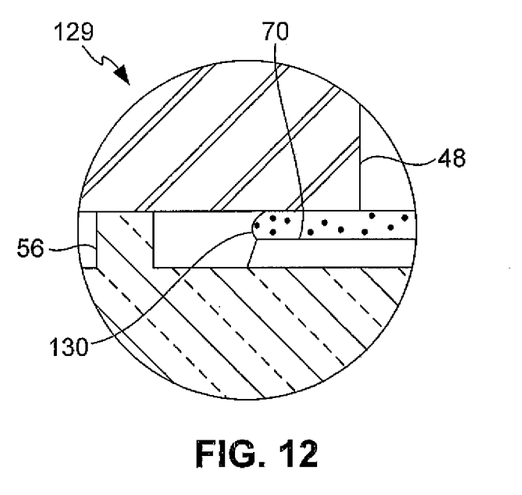
FIG. 12 is an enlargement of a portion of FIG. 11.

An enlarged area 129 of FIG. 11 is shown in FIG. 12. As illustrated in FIGS. 11 and 12, to aid retention of mirror 48, a thin coating of adhesive 130 can be applied to the mirror attachment surface defined by ridges 64-70 before placing mirror 48 on the mirror mounting surface defined by ridges 56-62. The thickness of the coating of adhesive 130 on ridges 64-70 should be equal to the amount by which ridges 64-70 are recessed below ridges 56-62, so that adhesive 130 is level with ridges 56-62. For purposes of clarity, only ridge 70 is shown in FIG. 12, but the same thin coating of adhesive 130 is applied to ridges 64, 66 and 68 in the same manner Thus, when mirror 48 is placed on the mirror mounting surface defined by ridges 56-62, the bottom surface of mirror 48 contacts adhesive 130. Adhesive 130 is then cured in any suitable manner. For example, adhesive 130 can be an epoxy that cures after an amount of time has elapsed. As adhesive 130 cures, adhesive 130 shrinks and thereby draws mirror 48 into contact with the mirror mounting surface defined by ridges 56-62. Note that no adhesive exists between mirror 48 and any of ridges 56-62; rather, mirror 48 rests on and is in direct contact with the mirror mounting surface defined by ridges 56-62. After adhesive 130 has cured, and mirror 48 has been drawn into contact with the mirror mounting surface defined by ridges 56-62, additional back-fill adhesive (not shown) can be applied to the gaps surrounding mirror 48 to more securely retain mirror 48 in place.

Figure 13:
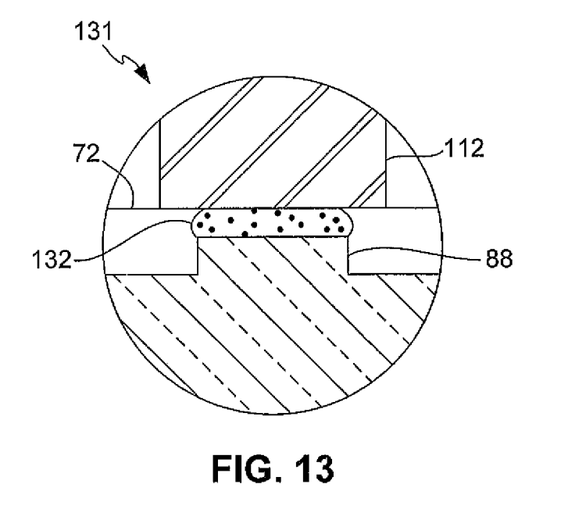
FIG. 13 is an enlargement of a portion of FIG. 8.

An enlarged area 131 of FIG. 8 is shown in FIG. 13. As illustrated in FIGS. 8 and 13, to aid retention of filters 106-112, a thin coating of adhesive 132 (which can be of the same type as adhesive 130) can be applied to the filter attachment surface defined by platforms 76-90 before placing filters 106-112 on the filter mounting surface defined by ridges 72 and 74. The thickness of the coating of adhesive 132 on platforms 76-90 should be equal to the amount by which platforms 76-90 are recessed below ridges 72 and 74, so that adhesive 132 is level with ridges 72 and 74. For purposes of clarity, only platform 88 is shown in FIG. 13, but the same thin coating of adhesive 132 is applied to all of platforms 76-90 in the same manner. Thus, when filters 106-112 are placed on the filter mounting surface defined by ridges 72 and 74, the bottom surfaces of filters 106-112 contact adhesive 132. Adhesive 132 is then cured. As adhesive 132 cures, adhesive 132 shrinks and thereby draws filters 106-112 into contact with the filter mounting surface defined by ridges 72 and 74. Note that no adhesive exists between filters 106-112 and either of ridges 72 or 74; rather, filters 106-112 rest on and are in direct contact with the filter mounting surface defined by ridges 72 and 74. After adhesive 132 has cured, and filters 106-112 have been drawn into contact with the filter mounting surface defined by ridges 72 and 74, additional back-fill adhesive (not shown) can be applied to the gaps surrounding filters 106-112 to more securely retain filters 106-112 in place.

Figure 14:
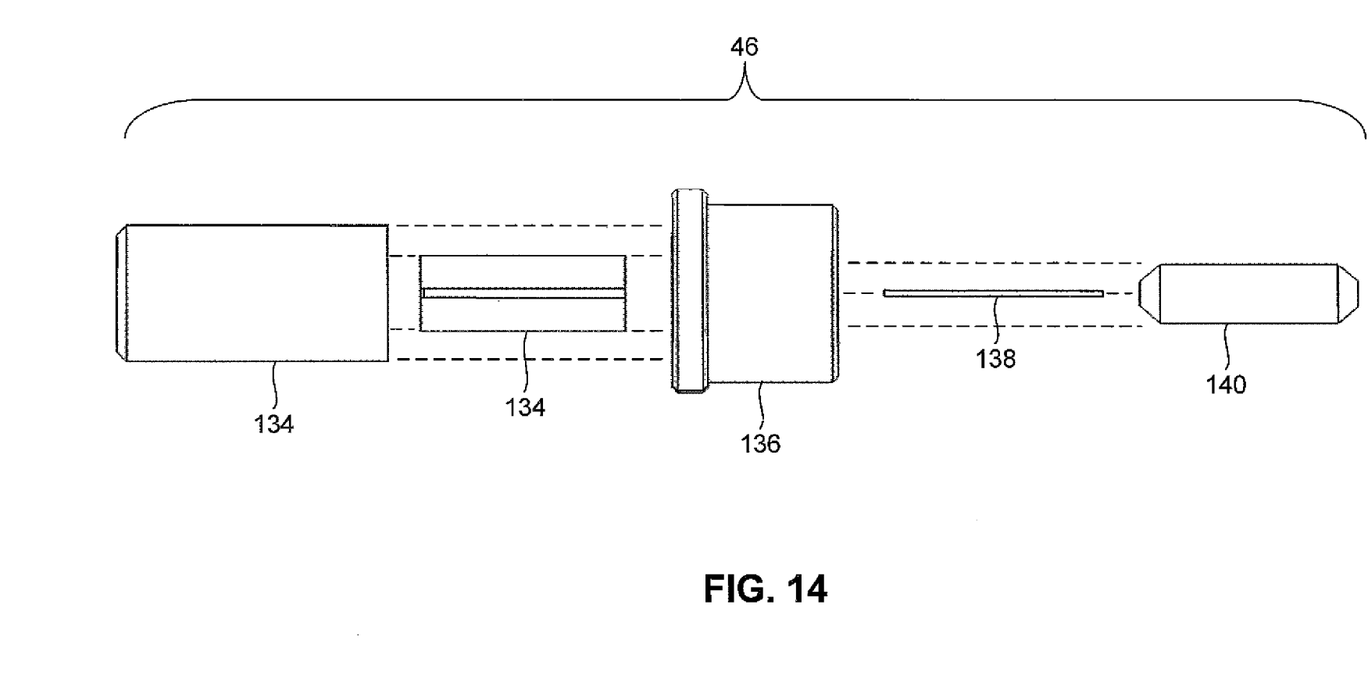
FIG. 14 is an assembly view of the LC connector assembly of the demultiplexing device.

As illustrated in FIG. 14, LC connector assembly 46 includes a metal LC port comprising a cylindrical inner section 134 and a barrel section 136. A fiber stub 138 is retained within a ferrule 140. Although not shown in FIG. 14, when LC connector assembly 46 is attached to optics body 42, one end of ferrule 140 extends into the cylindrical opening of fiber port 50 of optics body 42. The other end of ferrule 140 is retained within a split sleeve 142. Split sleeve 142 is, in turn, retained within the cylindrical inner section 134 of the LC port. One end of cylindrical inner section 134 is, in turn, retained within barrel section 136. In preparation for operation of demultiplexing device 40, an LC connector at the end of an optical fiber cable (not shown) can be plugged into the LC port. In operation, optical signals are emitted from such an optical fiber cable through the LC port and into fiber port 50 of optics body 42.

As illustrated in FIG. 11, in operation, the received optical signals propagate through the assembly comprising optics body 42, mirror 48 and filters 106-112 along an optical path indicated in broken line. The optical signals comprise four different modulated wavelengths $\lambda 1$, $\lambda 2$, $\lambda 3$ and $\lambda 4$. Reflective surface 102 reflects the optical signals onto mirror 48. Mirror 48 first reflects the optical signals onto filter 106, which is transparent to the single wavelength $\lambda 1$ and reflective to the other wavelengths $\lambda 2$, $\lambda 3$ and $\lambda 4$. Thus, the portion of the optical signals that impinge on filter 106 and consist of wavelength $\lambda 1$ pass through filter 106 and impinge on a first light detector (not separately shown) of an opto-electronic detector chip 144. Detector chip 144 can comprise, for example, four PIN diode regions, each sensitive to one of wavelengths $\lambda 1$, $\lambda 2$, $\lambda 3$ and $\lambda 4$. Detector chip 144 is mounted on the circuit board surface of printed circuit board assembly 44. The remaining portion of the optical signals that impinge on filter 106 and consist of wavelengths other than $\lambda 1$ are reflected by filter 106 and impinge on mirror 48. Mirror 48 reflects that remaining portion of the optical signals onto filter 108, which is transparent to the single wavelength $\lambda 2$ and reflective to at least $\lambda 3$ and $\lambda 4$. Thus, the portion of the optical signals that impinge on filter 108 and consist of wavelength $\lambda 2$ pass through filter 108 and impinge on a second light detector (not separately shown), such as a PIN diode, of detector chip 144. The remaining portion of the optical signals that impinge on filter 108 and consist of wavelengths other than $\lambda 2$ are reflected by filter 108 and impinge on mirror 48. Mirror 48 reflects that remaining portion of the optical signals onto filter 110, which is transparent to the single wavelength $\lambda 3$ and reflective to at least $\lambda 4$. Thus, the portion of the optical signals that impinge on filter 110 and consist of wavelength $\lambda 3$ pass through filter 110 and impinge on a third light detector (not separately shown), such as a PIN diode, of detector chip 144. The remaining portion of the optical signals that impinge on filter 110 and consist of wavelengths other than $\lambda 3$ are reflected by filter 110 and impinge on mirror 48. Mirror 48 reflects that remaining portion of the optical signals onto filter 112, which is transparent to the single wavelength $\lambda 4$. Thus, the portion of the optical signals that impinge on filter 112 and consist of wavelength $\lambda 4$ pass through filter 112 and impinge on a fourth light detector (not separately shown), such as a PIN diode, of detector chip 144.

The surfaces of mirror 48 and filters 106-112 can be made parallel to one another to a high degree of precision, because the mirror mounting surface and the filter mounting surface can be made parallel to one another to a high degree of precision. Such precise parallelism can be achieved by forming both the mirror mounting surface and the filter mounting surface in conjunction with one another in the same manufacturing process step. For example, a mold (not shown) can be provided in which mold features that correspond to ridges 72 and 74 are present on the same face or mold cavity as mold features that correspond to ridges 64-70. As well understood by persons skilled in the art, in a machining process for fabricating such a mold, a machine tool can form both the mold features that correspond to ridges 72 and 74 and the mold features that correspond to ridges 64-70 while the mold remains fixed in place with respect to the machine, i.e., in a single machining operation or step. Because the mold is not re-oriented with respect to the coordinate system of the machine between forming the mold features that correspond to ridges 72 and 74 and forming the mold features that correspond to ridges 64-70, tolerances in forming the mold features that correspond to ridges 72 and 74 and tolerances in forming the mold features that correspond to ridges 64-70 are not multiplied.

With reference again to FIG. 6, the foregoing characteristic can be stated in terms of a reference plane 146 that is parallel to both the mirror mounting surface and the filter mounting surface. It can be noted that no portion of optics body 42 intervenes between reference plane 146 and the filter mounting surface defined by ridges 72 and 74, and no portion of optics body 42 intervenes between reference plane 146 and the mirror mounting surface defined by ridges 56-62. In other words, there is an unimpeded path or line-of-sight between every point on ridges 72 and 74 and reference plane 146 and an unimpeded path or line-of-sight between every point on ridges 56-62 and reference plane 146. It follows that a mold (not shown) could be provided in which the mold features that correspond to ridges 72 and 74 and the mold features that correspond to ridges 56-62 exist on the same mold face or cavity as each other. Since the mold features that correspond to ridges 72 and 74 and the mold features that correspond to ridges 56-62 can be located with respect each other to a high degree of precision, when such a mold is used to form optics body 42 the resulting optics body 42 includes ridges 72 and 74 and ridges 56-62 that are located with respect to each other to a high degree of precision. As described above, it is important that the mirror mounting surface defined by ridges 56-62 be very precisely parallel to the filter mounting surface defined by ridges 72 and 74. Such precise parallelism can be achieved by the above-described means or similar means. Accordingly, when mirror 48 is mounted on the mirror mounting surface as described above, and filters 106-112 are mounted on the filter mounting surface as described above, mirror 48 is very precisely parallel to filters 106-112.

Referring again to FIG. 11, the assembly comprising optics body 42, filters 106-112 and mirror 48 can be mounted on printed circuit board assembly 44, which can comprise a flexible material of the type commonly referred to as "flex PC." When mounted on printed circuit board assembly 44, lenses 94-100 are optically aligned with the PIN diodes or other light detectors of detector chip 144. A stiffener pad 147 can be attached to the flex PC material beneath optics body 42.

Figure 15:
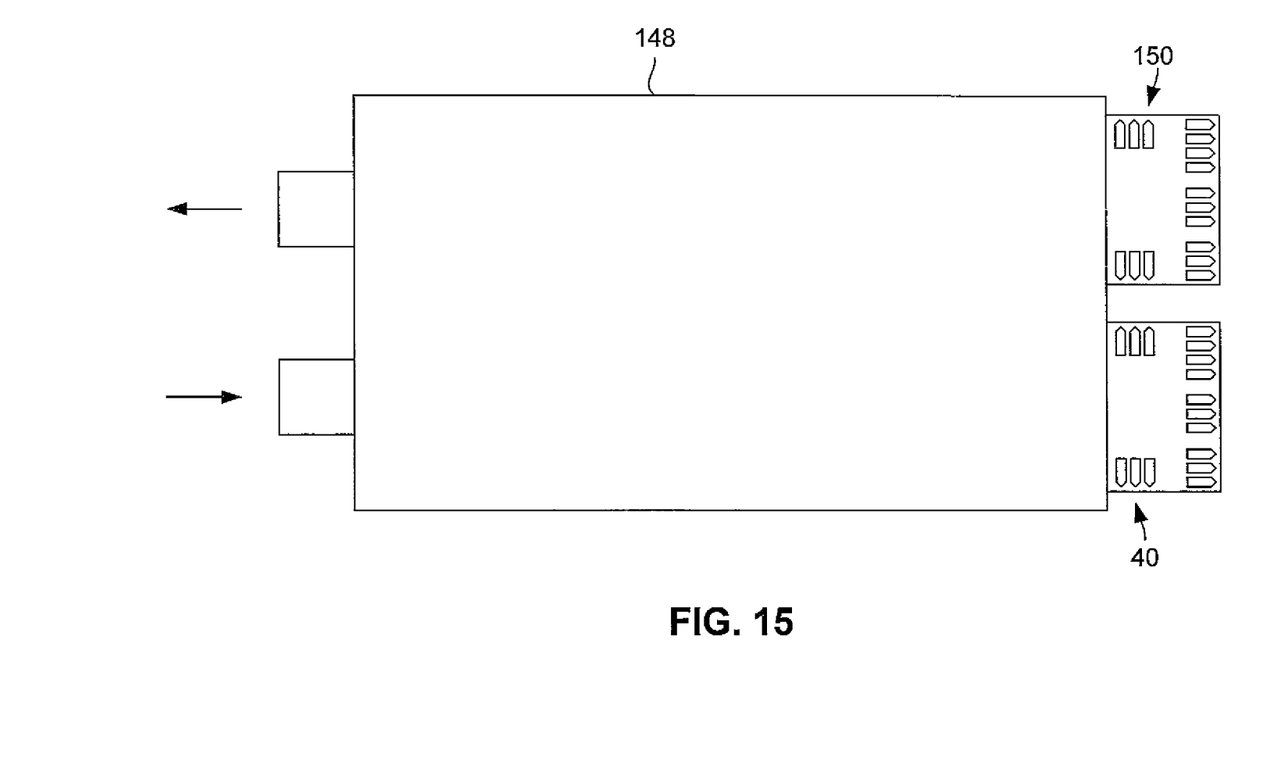
FIG. 15 is a top plan view of an optical transceiver that includes the demultiplexing device.

As illustrated in FIG. 15, optical demultiplexing device 40 (FIG. 2) can be housed within a transceiver housing 148 along with an optical transmitter device 150. Optical transmitter device 150 can be of any suitable type and, as well understood by persons skilled in the art, includes a light source such as a laser that converts electrical signals into optical signals. As such an optical transmitter device 150 is well known in the art, it is not described in further detail herein. As indicated by the arrows in FIG. 15, in operation optical demultiplexing device 40 receives optical signals, and optical transmitter device 150 transmits optical signals.

One or more illustrative embodiments of the invention have been described above. However, it is to be understood that the invention is defined by the appended claims and is not limited to the specific embodiments described.

What is claimed is:
1. An optical demultiplexing device, comprising:
a planar mirror;
an optics body having a fiber port configured to receive an end of an optical fiber, a reflective surface aligned with the fiber port, a substantially planar filter mounting surface, a substantially planar mirror mounting surface comprising a plurality of intersecting flat ridges upon which the planar mirror is mounted, and a mirror attachment surface recessed below the mirror mounting surface, the mirror attachment surface having an adhesive disposed thereof to retain the planar mirror on the mirror mounting surface, the filter mounting surface and the mirror mounting surface parallel to one another and parallel to a reference plane, and wherein no portion of the optics body intervenes between the mirror mounting surface and the reference plane;
a plurality of filters mounted on the filter mounting surface, each filter of the plurality of filters partially reflective and partially transparent, each of the plurality of filters transparent to a different wavelength than all others of the plurality of filters; and
a plurality of opto-electronic detectors, each filter of the plurality of filters interposed in one of a corresponding plurality of optical paths between one of the plurality of opto-electronic detectors and the planar mirror.
2. The optical demultiplexing device of claim 1, wherein the optics body consists of a continuous unitarily formed block of optically transparent material.
3. The optical demultiplexing device of claim 1, wherein the adhesive is disposed between and in contact with both the mirror attachment surface and the planar mirror but not disposed between and in contact with both the mirror mounting surface and the planar mirror.
4. The optical demultiplexing device of claim 3, wherein the adhesive comprises a cure-shrinkable epoxy.
5. The optical demultiplexing device of claim 1, wherein the optics body further comprises a filter attachment surface recessed below the filter mounting surface, and an adhesive disposed between and in contact with both the filter attachment surface and the plurality of filters but not disposed between and in contact with both the filter mounting surface and the plurality of filters.
6. The optical demultiplexing device of claim 5, wherein the adhesive comprises a cure-shrinkable epoxy.
7. The optical demultiplexing device of claim 1, wherein each filter of the plurality of filters is a thin-film single-wavelength filter.
8. The optical demultiplexing device of claim 1, wherein each filter of the plurality of filters is brick-shaped.
9. The optical demultiplexing device of claim 8, wherein the plurality of filters are mounted on the filter mounting surface in a staggered orientation, and staggered ends of the filters abut and are retained between portions of the optics body.
10. The optical demultiplexing device of claim 1, wherein the mirror comprises a metalized layer on a substrate.
11. The optical demultiplexing device of claim 1, wherein the optics body further comprises a plurality of lenses, each lens of the plurality of lenses interposed in one of the optical paths between the plurality of filters and the plurality of opto-electronic detectors.
12. The optical demultiplexing device of claim 11, wherein the plurality of lenses are disposed on a bottom of the optics body, the mirror mounting surface being disposed in a recessed region of a top of the optics body.
13. The optical demultiplexing device of claim 12, wherein the reflective surface is disposed in a cavity in the bottom of the optics body.
14. The optical demultiplexing device of claim 1, further comprising an LC connector assembly coupled to the fiber port.
15. The optical demultiplexing device of claim 14, wherein the LC connector assembly comprises a metal LC port.
16. The optical demultiplexing device of claim 15, wherein the LC connector assembly further comprises a split sleeve retained within the metal LC port, a ferrule retained within the split sleeve, and a fiber stub retained within the ferrule.
17. The optical demultiplexing device of claim 1, further comprising a printed circuit board, wherein the optics body and the plurality of opto-electronic detectors are mounted on the printed circuit board.
18. The optical demultiplexing device of claim 1, further comprising an optical transmitter and a transceiver housing, wherein the optical demultiplexing device and the optical transmitter are at least partly housed within the transceiver housing.
19. An optical demultiplexing device, comprising:
an optics body consisting of a continuous unitarily formed block of optically transparent material, the optics body having a fiber port unitarily formed in the block of optically transparent material and configured to receive an end of an optical fiber, a reflective surface unitarily formed in the block of optically transparent material and aligned with the fiber port, a substantially planar filter mounting surface unitarily formed in the block of optically transparent material, and a substantially planar mirror mounting surface unitarily formed in the block of optically transparent material, the filter mounting surface and the mirror mounting surface parallel to one another and parallel to a reference plane, and no portion of the optics body intervenes between the mirror mounting surface and the reference plane;

a planar mirror mounted on a first set of intersecting flat ridges of the mirror mounting surface;

a mirror attachment surface recessed below the mirror mounting surface, the mirror attachment surface comprising a second set of flat ridges;

a first adhesive disposed between and in contact with both the mirror and the second set of flat ridges of the mirror attachment surface and the mirror but not disposed between and in contact with both the mirror mounting surface and the mirror;

a plurality of filters mounted on the filter mounting surface, each filter of the plurality of filters partially reflective and partially transparent, each of the plurality of filters transparent to a different wavelength than all others of the plurality of filters;

a filter attachment surface recessed below the filter mounting surface;

a second adhesive disposed between and in contact with both the filter attachment surface and the plurality of filters but not disposed between and in contact with both the filter mounting surface and the plurality of filters; and a plurality of opto-electronic detectors, each filter of the plurality of filters interposed in one of a corresponding plurality of optical paths between one of the plurality of opto-electronic detectors and the mirror.

* * * * *